United States Patent
Perets et al.

(10) Patent No.: US 7,340,014 B2
(45) Date of Patent: Mar. 4, 2008

(54) APPARATUS AND METHOD OF MULTI-USER DETECTION

(75) Inventors: Yona Perets, Ra'anana (IL); Shimon Moshavi, Bet-Shemesh (IL)

(73) Assignee: Intel Corporation, Santa Clara, CA (US)

( * ) Notice: Subject to any disclaimer, the term of this patent is extended or adjusted under 35 U.S.C. 154(b) by 740 days.

(21) Appl. No.: 10/748,180

(22) Filed: Dec. 31, 2003

(65) Prior Publication Data
US 2005/0141653 A1 Jun. 30, 2005

(51) Int. Cl.
*H03D 1/00* (2006.01)
(52) U.S. Cl. .................. 375/342; 375/147; 375/148; 375/316
(58) Field of Classification Search ............... 375/147, 375/316, 342, 148; 370/342
See application file for complete search history.

(56) References Cited

U.S. PATENT DOCUMENTS

| 5,995,538 A | 11/1999 | Lomp | |
|---|---|---|---|
| 6,748,013 B2 * | 6/2004 | Reznik et al. | 375/148 |
| 6,754,253 B2 * | 6/2004 | Guey | 375/148 |
| 2001/0017883 A1 * | 8/2001 | Tiirola et al. | 375/148 |
| 2001/0046221 A1 * | 11/2001 | Ostman et al. | 370/335 |

FOREIGN PATENT DOCUMENTS

| WO | WO 98/08312 | 2/1998 |
|---|---|---|
| WO | WO 01/01594 | 1/2001 |

OTHER PUBLICATIONS

Poor, "Probability of Error in MMSE Multiuser Detection", IEEE Trans. Information Theory., vol. IT-43, No. 3, pp. 858 871, May 1997.*
International Search Report of PCT/US2004/018922, mailed Nov. 10, 2004.

* cited by examiner

*Primary Examiner*—Temesghen Ghebretinsae
*Assistant Examiner*—Juan Alberto Torres
(74) *Attorney, Agent, or Firm*—Pearl Cohen Zedek Latzer LLP

(57) ABSTRACT

Briefly, a decoder to decode a desired symbol within a plurality of multipath components. The decoder may include processing window that may be positioned around the desired symbol within a group of multipath components. A method for decoding the symbol is also provided.

7 Claims, 2 Drawing Sheets

APPARATUS AND METHOD OF MULTI-USER DETECTION

BACKGROUND OF THE INVENTION

In wireless communication systems, for example, cellular communication systems such as Wideband Code Division Multiple Access (WCDMA) and/or CDMA, signals may include symbols detectable by a Minimum Mean Squared Error (MMSE) detector. The MMSE detector may process a received signal to determine a desired symbol. For such processing, the MMSE detector may use a processing window of a certain length around the desired symbol. The length of the processing window may be determined based on a design parameter and may reflect a trade-off between performance and complexity. The processing window length may include a certain margin beyond the desired symbol length in order to minimize losses due to "edge effects" that may result from using a finite-length processing window.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
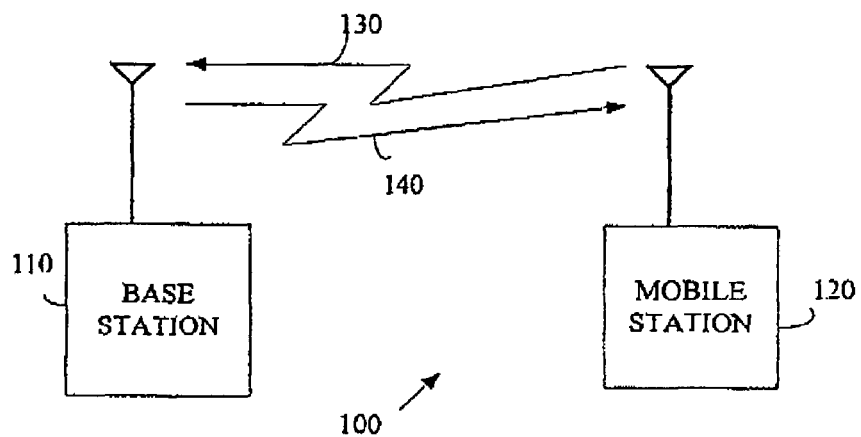
FIG. 1 is a block diagram of a wireless communication system, according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

It should be understood that the present invention may be used in a variety of applications. Although the present invention is not limited in this respect, the circuits and techniques disclosed herein may be used in many apparatuses such as, for examples modems, wireless local area network (WLAN) stations, receivers of a radio system or the like. Portable communication devices intended to be included within the scope of the present invention may include, by a way of example only, cellular radiotelephone portable communication devices, digital communication system portable devices and the like.

Types of cellular radiotelephone systems intended to be within the scope of the present invention include, although are not limited to, Code Division Multiple Access (CDMA) and WCDMA cellular radiotelephone portable devices for transmitting and receiving spread spectrum signals, Global System for Mobile communication (GSM) cellular radiotelephone, Time Division Multiple Access (TDMA), Extended-TDMA (E-TDMA), General Packet Radio Service (GPRS), Extended GPRS, and the like.

For simplicity, although the scope of the invention is in no way limited in this respect, embodiments of the present that will be described below may be related to a CDMA family of cellular radiotelephone systems that may include CDMA, WCDMA, CDMA 2000 and the like. The term "plurality" may be used throughout the specification to describe two or more components, devices, elements, parameters and the like. For example, "plurality of mobile stations" describes two or more mobile stations. In addition, it should be known to one skilled in the art that the term "a portable communication device" may refer to, but is not limited to, a mobile station, a portable radiotelephone device, a cell-phone, a cellular device, personal computer, Personal Digital Assistant (PDA), user equipment and the like.

Some embodiments of the invention may be implemented, for example, using a machine-readable medium or article which may store an instruction or a set of instructions that, if executed by a machine (for example, by station 110, and/or by other suitable machines), cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, high level design programming language, assembly language, machine code, or the like.

Referring firstly to FIG. 1, a block diagram of a wireless communication system 100 according to some embodiments of the present invention is shown. Wireless communication system 100 may include a base station and/or a plurality of base stations, and a mobile station and/or a plurality of mobile stations. For simplicity, a base station 110 and a mobile station 120 are shown.

Although the scope of the present invention is not limited in this respect, links, such as for example, an uplink and a downlink, may be used to transfer communications between base station 110 and mobile station 120. An uplink 130 may transfer communications from mobile station 120 to base station 110, and a downlink 140 may transfer communications from base station 110 to mobile station 120. Additionally, uplink 130 and downlink 140 may include one or more channels, which may be used for voice and data transportation. Furthermore, channels may carry signals, which may include symbols that include chips. Some of the signals may be spread over two or more multipaths and the symbols may be spread because a delay between the multipaths components. In addition, multipath components may be referred as diversity signals. For example, in those signals a symbol may be spread because of delays between other diversity signals. Signals providing diversity may include symbols that arise because of the multipath signals between a transmit antenna and a receiver, symbols that arise because of multiple transmit antennas at a single transmitter, and/or symbols that arise because of multiple transmitters. For example, multiple transmitters may provide diversity signals when performing a soft-handoff in a downlink CDMA system where multiple base stations may transmit the same symbol to a desired receiver.

Figure 2:
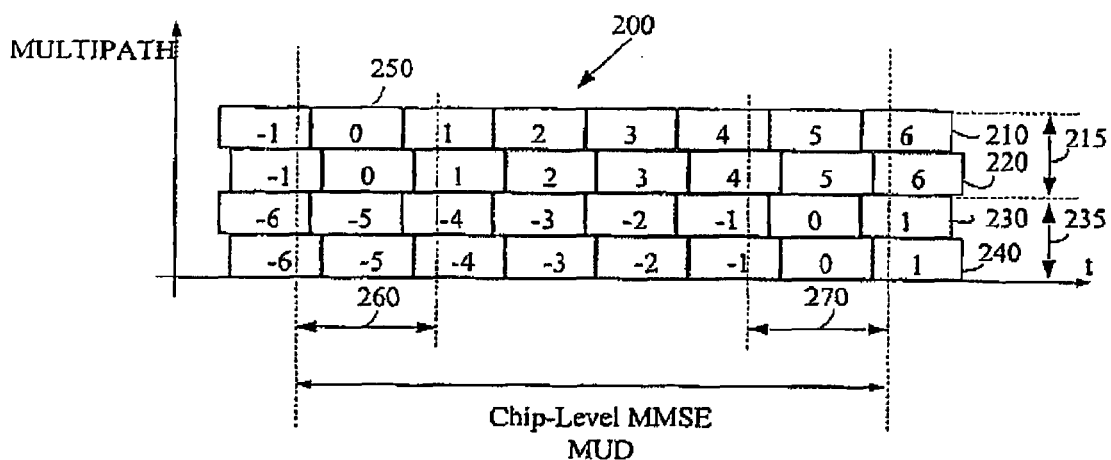
FIG. 2 is a schematic illustration of a graphic representation of multipaths of a communication channel according to an exemplary embodiment of the invention.

Turning to FIG. 2, a schematic illustration of graphic representation of multipaths of a communication channel 200 according to an exemplary embodiment of the invention is shown. Although it should be understood that the scope of the present invention is not limited in this respect, the above example is of a received signal from base station 110 with four multipath components 210, 220, 230, 240. A symbol, for example symbol 250 may represent the sum of number of symbols from downlink 130 that includes active user signals that may be transmitted synchronously from base station 110 and/or a plurality of base stations, if desired. In this example, multipath components 210, 220, 230 and 240 may be arranged, if desired, in groups of multipath components with a small delay between components within each group. For example, a small delay may be a delay between symbols less then a size of a processing window. Another example may be a delay of less then one symbol. Conversely, a large delay, e.g., between the groups of components, may be a delay between symbols greater than the size of the processing window, for example, a delay of more then one symbol. In this example, a five-symbol delays between group 215 and group 235, is shown. Group 215 may include multipath components 210, 220, and group 235 may include multipath components 230, 240.

Although the scope of the present invention is not limited in this respect, the grouping multipath components in groups may be done according to at least one of the flowing criteria. For example, paths with a small delay relative to the symbol length may be grouped together and/or paths with a large delay relative to the symbol length may be grouped separately. In addition, paths with a small delay relative to the processing window length may be grouped together and/or paths with large delay relative to the processing window length may be grouped separately. In some embodiments of the invention, the grouping criteria may be: a desired value of overall signal-to-interference/noise ratio after combining soft outputs of the processing window; and/or that the overall energy captured by the processing windows may be above a desired threshold, for example, 90% of the captured energy; and/or that interference energy suppressed may be in a desired level.

Although the scope of the present invention is not limited in this respect, in general, inputs which may affect decisions regarding grouping of multipath components may include: delay between components, energy profile of the inverse channel, symbol length, processing window length, receiver type, output signal-to-interference/noise ratio, level of interference suppression at the output of a receiver, level of energy captured by some and/or all processing windows, or the like. Furthermore, it should be understood that the above is an exemplary list of grouping criteria and other grouping criteria may be used with embodiments of the invention.

Although the scope of the present invention is not limited in this respect, in order to detect symbol 250, for example, symbol "0", a first processing window 260 may be positioned around symbol "0" of multipath components 210, 220 (e.g. group 215) and a second processing window 270 may be positioned around symbol "0" of multipath components 230, 240 (e.g. group 235). In this example, processing windows 260, 270 may process the information of the multipath components within group 215 and/or group 235, independently. In some embodiments of the invention, processing windows 260, 270 may provide soft outputs that may be combined using a suitable combining method, e.g., as is known in the art, into a single soft output, if desired.

Figure 3:
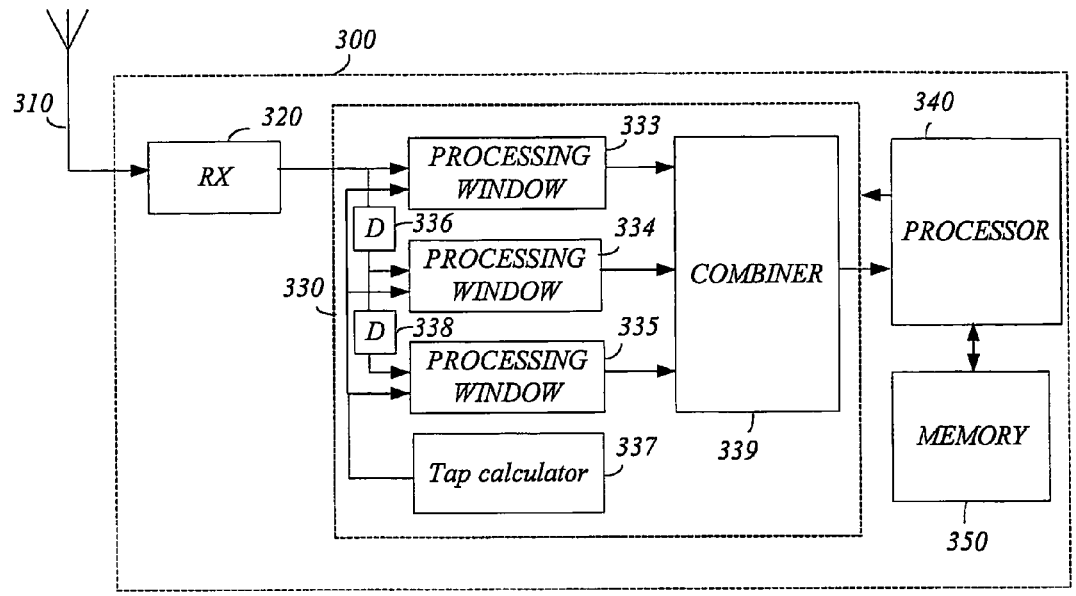
FIG. 3 is a block diagram of a mobile communication device according to one exemplary embodiment of the present invention.

Turning to FIG. 3, a block diagram of a communication device 300, according to one exemplary embodiment of the present invention is shown. Although the scope of the present invention is not limited in this respect communication device 300 may be, for example, a cellular radio telephone device, a wireless local area (WLAN), a base station of a cellular system, or the like. Communication device 300 may include: an antenna to receive and/or send signals; a receiver (RX) 320, for example, a CDMA receiver, a WCDMA receiver, or the like; a detector 330; a processor 340; and a memory 350. Although the scope of the present invention is not limited in this respect decoder 330 may include a desired number of processing windows units, for example processing windows units 333, 334, 335 as shown, and a combiner 339.

Although the scope of the present invention is not limited in this respect, antenna 310 may receive a spread spectrum modulated radio frequency (RF) signal. Although the scope of the present invention is not limited in this respect, antenna 310 may include an internal antenna, a dipole antenna, an omni-directional antenna, a monopole antenna, an end fed antenna, a circularly polarized antenna, a micro-strip antenna, a diversity antenna, and the like.

In some embodiments of the present invention, receiver 320 may receive the RF signal from antenna 310. Receiver 320 may demodulate the RF signal and may provide samples of the received symbols to detector 330, if desired.

As mentioned above, detector 330 may include a desired number of processing windows units such as, for example, processing windows units 333, 334, 335. In some embodiments of the invention, a processing windows unit, for example processing window unit 333, may include a processing window. The desired number of processing windows units for example, processing window 333 and/or processing window 334 and/or processing window 335, and the length of an individual processing window, for example processing window 260 of FIG. 2, may be determined by the relative location of the processed symbol (e.g. symbol "0") within multipath components 210, 220, 230, 240 (FIG. 2). For example, processing windows units 260 and 270 may process symbol "0" in parallel, if desired. In some other embodiments of the invention, overlapping processing windows may be used. In those embodiments, combining methods to combine the output of the overlapping windows may include, for example, a MMSE combining method, or a Maximal Ratio combining method or any other suitable combining methods as are known in the art, if desired.

Furthermore, the multipath groups, e.g., groups 215, 235, may be processed independently.

Although the scope of the present invention is not limited in this respect, in some embodiments of the invention detector 330 may be a chip-level MMSE linear multi user (MUD) detector and a chip-level MMSE detection method may be applied separately to processing windows units 333, 334 and 335. The output from processing windows units 333, 334, 335 may be a soft-output that may be combined by combiner 339. The soft-outputs of processing windows units 333, 334, 335 may be combined using a suitable method, for example, maximal ratio combining, MMSE combining, and the like.

Although the scope of the present invention is not limited in this respect, tap calculator 337 may calculate the tap and may provide respective weight values to the processing windows of processing windows units 333, 334 and 335. In some embodiments of the invention, the number of tap calculators may be equal to the number of processing windows units. In those embodiments, an independent tap calculator may be connected to each processing window unit 335. Although the scope of the present invention is not limited in this respect, tap calculator 337 may calculate a weight value 'w' according to the following equation:

$$w = (E[vv'])^{-1} E[vs_{0,0}^*] \qquad (1)$$

wherein w may represent the weight vector; E may represent an expectation function; v may represent received samples; and s may represent a desired symbol. Furthermore, the desired symbol may be depicted by $s_{0,0}$, $=w'v$, wherein $(\cdot)^*$ indicates the conjugate and $(\cdot)'$ indicates the conjugate transposed.

In some embodiments of the invention, processor 340 may process the decoded symbols and may group multipath components 210, 220, 230, 240, e.g., in groups 215, 235, based on a relative delay between the desired symbol within one multipath component and the desired symbol within one or more other multipath components. In addition, processor 340 may determined a length and/or a size of the first processing window and the second processing window, wherein the length the first processing window (e.g., the processing window of processing window unit 333) and the length of the second processing window (e.g., the processing window of processing windows unit 334) may be greater than a length of the desired symbol (e.g. symbol 250). In some embodiments of the invention, the length and/or the size of processing windows of processing windows units 333, 334, 335 may be adaptively modified based on changes in the condition of at least one component and/or parameter of the communication system, for example, a change in the channel and/or a change in a transmitter and/or a change in a receiver, or any other desired type of change.

Although the scope of the present invention is not limited in this respect, it should be understood different lengths and/or sizes may be applied to different processing windows based on a desired criterion. Furthermore, the desired symbol may be fragmented into two or more fragments and the fragments may be processed by different processing windows, if desired. In some embodiments of the invention, processor 340 may place the first and second processing windows (e.g. of processing windows 333, 334, 335) so as to encompass the desired symbol (e.g. symbol "0") within group 215 and the desired symbol (e.g. symbol "0") within group 235, respectively. Memory 350 may store the processing results and may store instructions of decoder 330, if desired. In addition, in some embodiments of the invention, one or more delay units, for example, delay units 336, 338, may be applied between the output of RX unit 320 and the input to one or more of the processing windows, e.g., to provide a desired delay that may used to synchronize the processing windows of processing windows units 333, 334, 335, if desired. In some embodiments of the invention, delay unit 336 may provide a delay value different from the delay value provided by delay unit 338. For example, delay unit 336 may delay the symbols stream from RX unit 320 for a time period based on a delay between the symbols of multipath components processed by processing window 333 and the symbols of multipath components processed by processing window 334. Similarly, in this example, delay unit 338 may delay the symbol stream from RX unit 320 for a time period based on a delay between the symbols of multipath components processed by processing window unit 334 and the symbols of multipath components processed by processing window unit 335.

Figure 4:
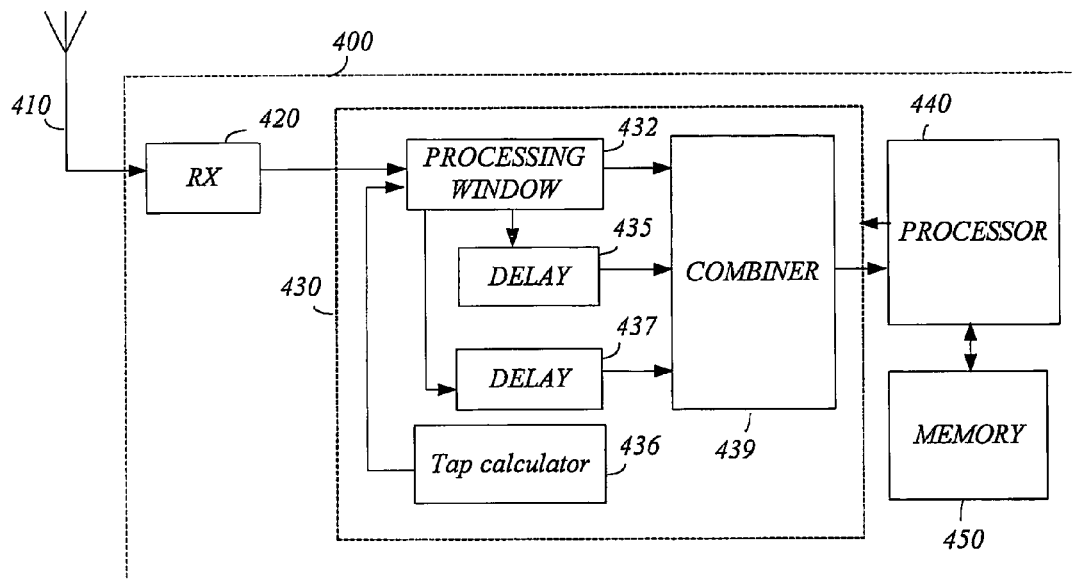
FIG. 4 is a block diagram of a mobile communication device according to another exemplary embodiment of the present invention.

Turning to FIG. 4, a block diagram of a communication device 400, according to one exemplary embodiment of the present invention is shown. Although the scope of the present invention is not limited in this respect, communication device 400 may be, for example, a mobile cellular radio telephone device, a mobile station, a base station, a base station of a cellular system, a wireless local area (WLAN) station, or the like. Communication device 400 may include: an antenna to receive a signal; a receiver (RX) 420, for example, a CDMA receiver, a WCDMA receiver, or the like; a detector 430; a processor 440; and a memory 450. Although the scope of the present invention is not limited in this respect, detector 430 may include a processing window unit 432, a delay unit 435, a delay unit 437, a tap calculator 436 and a combiner 439.

Although the scope of the present invention is not limited in this respect, antenna 410 may receive a spread spectrum modulated radio frequency (RF) signal. Receiver 420 may receive the RF signal from antenna 410. In embodiments of the invention, receiver 420 may demodulate the RF signal and may provide samples of a baseband signal to detector 430. In some embodiments of the invention, processing window unit 432 include one or more processing windows to apply a detection method, e.g., a MMSE detection method, multiple times, for example, to detect the desired symbol once per multipath group (e.g. group 215 and/or group 235). Thus, processing window unit 432 may include, for example, a virtual configuration of multiple processing windows.

Although the scope of the present invention is not limited in this respect, the processing windows of processing window unit 432 may process the desired symbol (e.g. symbol "0") from a first group of multipath components (e.g. group 215) and may provide the output to delay unit 435. In addition, the processing windows of processing window unit 432 may process the desired symbol (e.g. symbol "0") with a second group of multipath components (e.g. group 235) and provide the output to delay unit 437.

Although the scope of the present invention is not limited in this respect, in some other embodiments of the invention, delays that may be generated by delay unit 435 and delay unit 437 may be provided by a memory device, e.g., memory 450, if desired. For example, the output of processing window unit 432 may be stored for the time needed to process the desired symbol in different multipath component groups. In this example, combiner 439 may receive the processed output of processing window unit 432 of the multipath component groups from a memory with the respective delays applied by delay units 435 and 437, if desired.

Although the scope of the present invention is not limited in this respect, tap calculator 436 may perform similar or same function as the function that perform by tap calculator 337 of FIG. 3, if desired. In some embodiments of the invention, combiner 439 may be similar to combiner 339 and may operate combining methods as described above with reference to FIG. 3. In this embodiment, processor 440 and memory 450 may provide functions similar to those described above with reference FIG. 3, if desired. However, in some other embodiments of the invention, memory 450 may be used to delay output signals from processing window unit 432, as described herein.

Although the scope of the present invention is not limited in this respect, in some embodiments of the invention, the methods of processing the desired symbol may be mixed. For example, in some embodiments of the present invention, the multiple processing windows approach (e.g., as in FIG. 3) may be mixed with the single processing window approach (e.g., multiple virtual processing windows), as in FIG. 4, if desired. In those embodiments of the invention, a small number of processing windows may be used, wherein one or more of such processing windows may have the capability to handle a combination of more than one group of multipath components.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising:
    grouping symbols of two or more received multipath components of a received baseband signal in two or more groups to detect a desired symbol, wherein, the grouping is based on a delay spread between the two or more components, wherein grouping symbols comprises grouping symbols within a first delay spread range in a first group, and grouping symbols within a second delay spread range in a second group; and
    processing said desired symbol in the two or more groups of symbols of the multipath components by positioning two or more processing windows around the desired symbol within the two or more groups, respectively, wherein processing said desired symbol comprises:
        fragmenting the desired symbol into at least first and second fragments,
        adaptively positioning the first processing window to encompass the first fragment and the second processing window to encompass the second fragment,
        applying first and second processing windows to the first and second groups, respectively, and
        combining soft outputs of the first and second processing windows into a desired output related to a detected symbol.

2. The method of claim 1 comprising:
    processing samples of the received baseband signal in the group by minimum mean squared error multiuser detection.

3. The method of claim 1, comprising:
    decoding by a processing window the desired symbol within first and second groups;
    delaying a first processing result of the first group and a second processing results of the second group; and
    combining the first processing result with the second processing result.

4. The method of claim 1 comprising:
    assigning first and second window lengths to the first and second processing windows, respectively.

5. The method of claim 1 comprising overlapping the first and second processing windows.

6. The method of claim 1 comprising:
    adaptively positioning the first or the second processing windows to encompass the desired symbol based on a communication system parameter.

7. The method of claim 1 comprising:
    processing the desired symbol by applying to the symbols of the two or more received multipath components of the baseband signal at least one processing window to process the desired symbol in one group and at least one other processing window to process the desired symbol in two or more groups.

* * * * *